United States Patent
Tylik et al.

(10) Patent No.: US 11,831,634 B2
(45) Date of Patent: Nov. 28, 2023

(54) MANAGING TRUSTED COMMUNICATIONS BETWEEN SERVER AND CLIENTS

(71) Applicant: EMC IP Holding Company LLC, Hopkinton, MA (US)

(72) Inventors: Dmitry Nikolayevich Tylik, Westborough, MA (US); Charles W. Kaufman, Redmond, WA (US); Gregory W. Lazar, Upton, MA (US); Marco Abela, Canton, MA (US); Jingyan Zhao, Harvard, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 327 days.

(21) Appl. No.: 17/084,922

(22) Filed: Oct. 30, 2020

(65) Prior Publication Data
US 2022/0141210 A1 May 5, 2022

(51) Int. Cl.
  *H04L 29/06* (2006.01)
  *H04L 9/40* (2022.01)
  *G06F 9/455* (2018.01)

(52) U.S. Cl.
  CPC ...... *H04L 63/0823* (2013.01); *G06F 9/45558* (2013.01); *H04L 63/0236* (2013.01); *H04L 63/166* (2013.01); *G06F 2009/45587* (2013.01); *G06F 2009/45595* (2013.01)

(58) Field of Classification Search
  None
  See application file for complete search history.

(56) References Cited

U.S. PATENT DOCUMENTS

| | | | |
|---|---|---|---|
| 8,850,208 B1 | 9/2014 | Parkinson | |
| 9,021,255 B1 | 4/2015 | Aharoni et al. | |
| 9,933,957 B1 | 4/2018 | Cohen et al. | |
| 10,678,576 B1 | 6/2020 | Taylor et al. | |
| 2004/0243805 A1* | 12/2004 | Enokida | H04L 9/0891 713/175 |
| 2007/0043860 A1* | 2/2007 | Pabari | G06F 9/45558 709/224 |
| 2008/0263215 A1* | 10/2008 | Schnellbaecher | H04L 63/0884 709/229 |
| 2011/0264905 A1* | 10/2011 | Ovsiannikov | H04L 63/0281 713/151 |
| 2017/0310670 A1* | 10/2017 | Bronshtein | H04L 9/30 |
| 2018/0309795 A1* | 10/2018 | Ithal | H04L 63/1425 |
| 2018/0332031 A1* | 11/2018 | Watanabe | H04L 9/3263 |

OTHER PUBLICATIONS

Uday Hiwarale, "A brief overview of the TCP_IP model, SSL/TLS/HTTPS protocols and SSL certificates", downloaded Oct. 22, 2020 from https://medium.com/jspoint/a-brief-overview-of-the-tcp-ip-model-ssl-tls-https-protocols-and-ssl-certificates-d5a6269fe29e (Feb. 1, 2020).

* cited by examiner

*Primary Examiner* — William J. Goodchild
(74) *Attorney, Agent, or Firm* — BainwoodHuang

(57) ABSTRACT

A technique for managing communications between a server and multiple clients includes configuring the server to support multiple sets of certificates for respective clients having respective root certificates. The technique further includes determining an indicator associated with a client root certificate during an initial handshake between a client and the server and providing the client with a server certificate associated with the indicator.

17 Claims, 4 Drawing Sheets

MANAGING TRUSTED COMMUNICATIONS BETWEEN SERVER AND CLIENTS

BACKGROUND

Devices connected to computer networks such as the Internet commonly employ digital certificates to authenticate their identities and establish trust. For example, properly signed digital certificates can help to ensure that parties to online communications are who they purport to be. A common use of digital certificates is thus to prevent man-in-the-middle attacks. SSL (Secure Sockets Layer) and TLS (Transport Layer Security) rely on digital certificates for secure communications. TLS is a central basis for security in HTTPS (Hypertext Transfer Protocol Secure) communication over the web.

In one scenario, a TLS client initiates communication with a TLS server over a network. As part of an initial handshake, the client and server may exchange digital certificates. If the certificates are properly signed, a trusted communication may follow. But if the certificates are not properly signed, the parties may seek to obtain proper certificates before proceeding.

Consider a case where the client has a properly-signed certificate but the server does not. Rather, the server has a self-signed certificate. Self-signed certificates are common but are not generally considered secure. The client may respond to receipt of a self-signed certificate by performing an exchange operation, which may involve obtaining approval of the self-signed certificate from a human administrator and then coordinating with the server to generate a signed server certificate from a signing authority, based on the administrator's approval. The next time the client initiates a TLS communication with the server, the properly signed certificates can be exchanged and a trusted communication can ensue, quickly and without the need for human intervention.

SUMMARY

In some situations, the signing authority that the client uses in generating the signed server certificate uses a root certificate that has been specially issued to the client. The signed server certificate generated between the client and the server is thus based on the specific root certificate. If a second client having a different root certificate initiates a TLS session with the same server, the initial handshaking may fail and the server may respond by presenting the self-signed certificate to the second client. The second client may then follow the same procedure as described above, e.g., by initiating its own exchange operation, in which administrator approval of the self-signed certificate is obtained and a second signed server certificate is generated, this time based on the root certificate of the second client.

Unfortunately, the above manner of managing certificates can disrupt already-established trust relationships. For example, action of the second client may cause the server to replace the signed server certificate of the first client with the signed server certificate of the second client, causing the first client to go from being trusted to being untrusted. The next time the first client attempts to connect to the server, the first client again receives the self-signed certificate and must perform the exchange operation again. And if the first client succeeds with the exchange operation, the second client will no longer be able to resume trusted communications automatically. Thus, the last client for which a signed server certificate is generated disrupts the server's trust relationships with its other clients. This state of affairs is inconvenient at best and results in costly disruptions at worst. It can also lead to a situation where servers essentially become dedicated to particular clients, e.g., those having the same root certificates. The result is a poor allocation of resources and generally high cost. A more flexible approach is needed.

In contrast with the prior approach, in which clients can replace certificates of other clients and thus disrupt those clients, an improved technique includes configuring a server to support multiple sets of certificates for respective clients having respective root certificates. The technique includes determining an indicator associated with a client root certificate during an initial handshake between a client and the server and providing the client with a server certificate associated with the indicator. Advantageously, the server matches clients with server certificates created for those clients, enabling multiple clients to carry out trusted communications with the server automatically and without disrupting communications of other clients.

Certain embodiments are directed to a method of managing communications between a server and multiple clients. The method includes storing, by the server, multiple signed server certificates associated with respective clients and issued using respective root certificates of the respective clients. The method further includes receiving, by the server, a request from a client to participate in a TLS (Transport Layer Security) session with the server, and providing a signed server certificate from among the signed server certificates to the client. The signed server certificate is selected for provision to the client based on an indicator determined from the request. The client and server thereupon participate in the TLS session using the signed server certificate.

Other embodiments are directed to a computerized apparatus constructed and arranged to perform a method of managing communications between a server and multiple clients, such as the method described above. Still other embodiments are directed to a computer program product. The computer program product stores instructions which, when executed on control circuitry of a computerized apparatus, cause the computerized apparatus to perform a method of managing communications between a server and multiple clients, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Embodiments of the improved technique will now be described. One should appreciate that such embodiments are provided by way of example to illustrate certain features and principles but are not intended to be limiting.

An improved technique of managing communications between a server and multiple clients includes configuring the server to support multiple sets of certificates for respective clients having respective root certificates. The technique further includes determining an indicator associated with a client root certificate during an initial handshake between a client and the server and providing the client with a server certificate associated with the indicator. Advantageously, the server matches clients with server certificates created for those clients, enabling multiple clients to carry out trusted communications with the server automatically and without disrupting communications of other clients.

Figure 1:
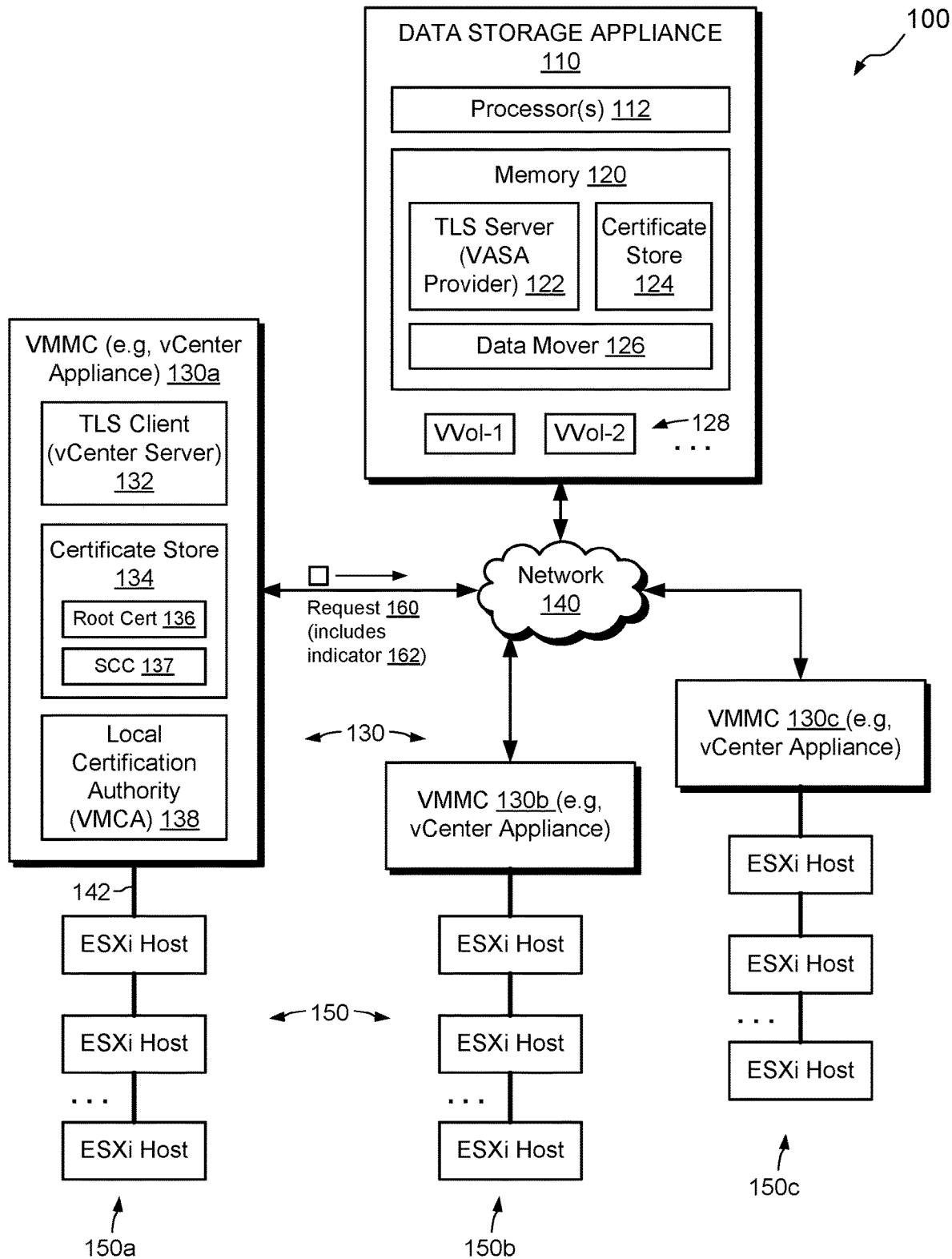
FIG. 1 is a block diagram of an example environment in which embodiments of the improved technique can be practiced.

FIG. 1 shows an example environment 100 in which embodiments of the improved technique can be practiced. Here, a server 110, such as a data storage appliance, is connected over a network 140 to multiple clients 130, such as multiple virtual machine management consoles (VMMCs). Each VMMC 130 is associated with one or more hosts 150, which may fall under a management control of the respective VMMCs 130. For example, hosts 150a may be managed by VMMC 130a, hosts 150b may be managed by VMMC 130b, and hosts 150c may be managed by VMMC 130c. Each VMMC 130 may manage any number of hosts 150, and the environment 100 may include any number of VMMCs 130.

In an example, hosts 150 are computers configured as hypervisors, via hardware and/or installed software. The hosts 150 are thus capable of running virtual machines (VMs). Hosts 150 may be configured as ESXi hosts (e.g., running VMware ESXi hypervisors) or as other types of hypervisors. Also, hosts 150 may connect to the respective VMMCs 130 over lines 142, which are parts of the network 140. Thus, hosts 150 generally have network access to server 110, i.e., the data storage appliance.

The VMMCs 130 may be provided as vCenter server appliances, available from VMware, Inc. of Palo Alto, Calif. Other examples of VMMCs include appliances for managing Microsoft Hyper-V environments and Linux KVM environments. However, the server 120 and clients 130 may be any type or types of computing device or devices capable of communicating over the network 140. The virtual-machine implementation described herein is intended merely as illustrative. The server 110 may include any number of computers, which function together as the server 110 Likewise, the each of the clients 130 may include any number of computers.

The network 140 is configured to support Internet communications, such as those involving TCP/IP (Transport Control Protocol/Internet Protocol) and TLS (Transport Layer Security). For example, the data storage appliance 110, VMMCs 130, and hosts 150 may all be capable of supporting TLS communications with one another over the network 140.

The data storage appliance 110 may be realized as a block-based data storage system, as a file-based data storage system, as a system that combines both block-based and file-based storage, or as a data storage system that stores data in other formats. Also, the terms "data storage appliance" and "data storage system" may be used herein interchangeably. The data storage appliance 110 includes a set of processors 112 and memory 120. The set of processors 112 includes one or more processing chips and/or assemblies, such as numerous multi-core CPUs (central processing units). The memory 120 includes both volatile memory, e.g., RAM (Random Access Memory), and non-volatile memory, such as one or more ROMs (Read-Only Memories), disk drives, solid state drives, and the like. The set of processing units 112 and the memory 120 together form control circuitry, which is constructed and arranged to carry out various methods and functions as described herein. Also, the memory 120 includes a variety of software constructs realized in the form of executable instructions. When the executable instructions are run by the set of processors 112, the set of processors 112 carry out the operations of the software constructs. Although certain software constructs are specifically shown and described, it is understood that the memory 120 typically includes many other software components, which are not shown, such as an operating system, various applications, processes, and daemons.

As further shown in FIG. 1, the memory 120 of server 110 "includes," i.e., realizes by execution of software instructions, a TLS server 122, such as a VASA vendor provider ("VASA" stands for VMware vSphere API for Storage Awareness), a certificate store 124, and data mover software 126. The TLS server 122 includes software that enables the server 110 to operate as a TLS server during Internet communications. Although its role as TLS server is emphasized here, the server 110 may also include software for operating as a TLS client. In some examples, the TLS server 122 is implemented as a web server. The certificate store 124 is a database or other storage construct configured to store digital certificates relevant to TLS communications. Examples of digital certificates may include self-signed certificates, server certificates, client certificates, and root certificates, for example. Data mover software 126 enables the data storage appliance 110 to respond to read and write instructions, which may arrive over the network 140, by reading and writing data objects 128 hosted by the data storage appliance 110. The data storage appliance 110 may persistently store the data objects 128, e.g., using magnetic disk drives, solid-state drives, and/or the like.

In the example shown, data objects 128 correspond to VVols (virtual volumes), such as VVol-1 and VVol-2. As is known, VVols are virtual disks that can be accessed by virtual machines. For example, a virtual machine running on a host 150 may have a C: drive, which the data storage appliance stores as VVol-1. The same virtual machine may also have a D: drive, which the data storage appliance stores as VVol-2. Data storage appliance 110 may host any number of VVols for any number of virtual machines running on the hosts 150. Such hosts 150 may thus connect to the data storage appliance 110 over the network 140 to access their data.

As further shown, VMMC 130a, which is intended to be representative of all VMMCs 130, includes a TLS client 132, a certificate store 134, and a local certification authority (CA) 138. The TLS client 132 includes software that enables the VMMC 130 to operate as a TLS client during Internet communications. Although its role as TLS client is emphasized here, the VMMC 130a may also include software for operating as a TLS server. In some examples, the TLS client 132 is implemented using a web browser, another web-enabled application, or multiple such applications.

The certificate store 134 is a database or other storage construct configured to store digital certificates relevant to TLS communications involving the VMMC 130a. Stored certificates may include a root certificate 136, which has been specifically provisioned to the VMMC 130a. For example, each VMMC 130 may have a unique root certificate. The stored certificates may further include a signed client certificate (SCC) 137, such as a signed certificate of the VMMC 130a. Different VMMCs 130 may have different signed client certificates 137.

Local certificate authority 138 is a signing authority authorized to sign digital certificates. In an example, each VMMC 130 has its own local certificate authority and each local certificate authority is associated with a respective root certificate. Here, local certification authority 138 is associated with root certificate 136 and uses this root certificate 136 to sign other certificates, thus granting them trusted status.

In example operation, VMMC 130a, acting as a TLS client, issues a request 160 over the network 140 to initiate a TLS session with the data storage appliance 110, acting as a TLS server. The request 160 includes or is otherwise associated with an indicator 162, which identifies the VMMC 130a from among the VMMCs 130 in the environment 100. As will be described more fully below, the indicator 162 enables the data storage appliance 110 to identify a proper set of certificates in its certificate store 124 to use for conducting trusted communications with the VMMC 130a automatically, without involvement of an administrator. Also, if the data storage appliance 110 does not store certificates associated with the indicator 162, the data storage appliance 110 may respond by initiating a registration procedure in which properly signed certificates may be generated, stored, and associated with the indicator 162. Further details of operation may be understood with reference to FIG. 2.

Figure 2:
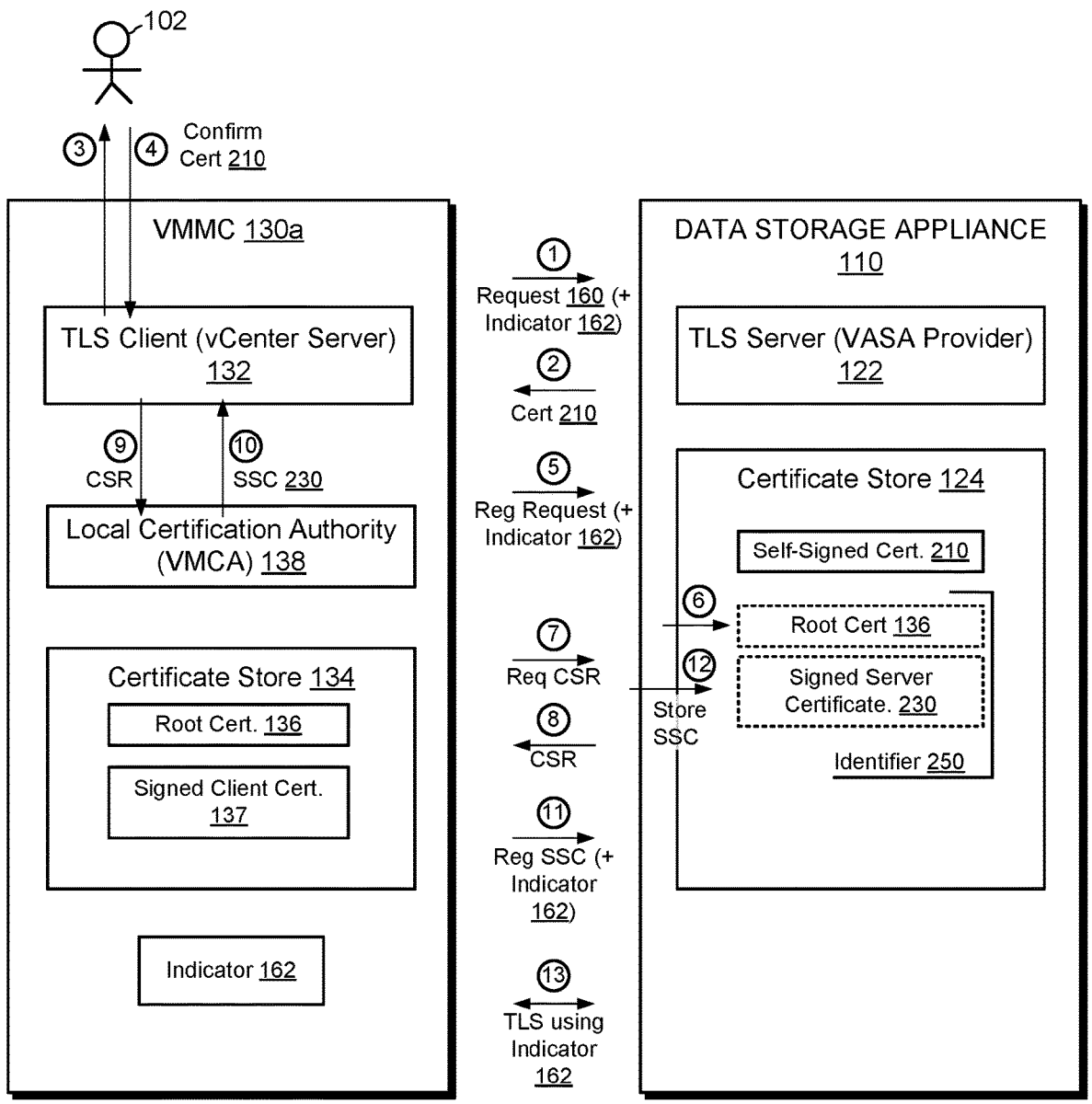
FIG. 2 is a block diagram of an example arrangement for establishing a trusted communication session between a server and a first client.

FIG. 2 shows an example arrangement for establishing a TLS communication session between VMMC 130a and the data storage appliance 110. As above, VMMC 130a acts as a TLS client and data storage appliance 110 acts as a TLS server. For this example, we assume that data storage appliance 110 is in an initial state or otherwise does not store certificates needed for trusted communications with VMMC 130a. The encircled numerals depict an example sequence of activities (represented in the text here as numerals within parentheses). In the ensuing procedure, it is assumed that each step in the procedure executes successfully. One should recognize, though, that failure of any step may result in TLS communications being blocked or otherwise not proceeding.

At (1), VMMC 130a sends a request 160 to data storage appliance 110 to initiate a TLS session. The request 160 includes or is otherwise associated with an indicator 162 (FIG. 1), which is preferably unique to the VMMC 130a. For example, the indicator 162 may include a UUID (Universally Unique Identifier). In some examples, the indicator 162 includes a host name of VMMC 130a, or a combination of UUID and host name, and/or other identifying information.

The data storage appliance 110 receives the request 160 and checks whether the indicator 162 corresponds to any certificates in its certificate store 124. For example, the certificate store 124 may associate certificates of respective clients 130 with respective identifiers.

At (2), if the indicator 162 received with the request 160 fails to match any of the identifiers 250, then the VMMC 130a is untrusted and the data storage appliance 110 responds by providing a self-signed certificate 210. Self-signed certificates are commonly used but do not provide a high level of security. However, they may allow initial communications to proceed.

At (3), the VMMC 130a presents the self-signed certificate 210 to a human administrator 102, e.g., by displaying the self-signed certificate 210 on a computer monitor viewable by the administrator 102. The administrator 102 may inspect the certificate, e.g., by checking its authenticity. The administrator 102 may provide an affirmative response at (4) in which the self-signed certificate 210 is confirmed.

At (5), the VMMC 130a initiates a registration procedure in an effort to produce a more trusted signed server certificate for the data storage appliance 110. For example, VMMC 130a sends a registration request to the data storage appliance 110, which includes as parameters a user name, a password, and the root certificate 136, for example. The registration request may also include the above-described indicator 162, which serves to identify the VMMC 130a. In a particular example, the registration is implemented as an API call having the form registerCACertificatesAndCRLs ( ).

At (6), the data storage appliance 110 receives the registration request and attempts to validate the credentials (e.g., user name and password). Assuming success, the data storage appliance 110 stores the root certificate 136 in the certificate store 124 and associates that root certificate 136 with an identifier 250, which may be selected to match the indicator 162 (or to be derivable therefrom).

At (7), the VMMC 130a sends a request to the data storage appliance 110 for a certificate signing request (CSR). In a particular example, the request is implemented as an API call having the form requestCSR ( ). At (8), the data storage appliance 110 responds by providing the requested CSR.

At (9), the VMMC 130a passes the received CSR to the local certification authority 138. At (10), the local certification authority 138 responds by generating a signed server certificate 230.

At (11), the VMMC 130a sends a registration command to the data storage appliance 110. The registration command includes both the signed server certificate 230 and the indicator 162. In a particular example, the registration command is implemented as an API call having the form registerCASignedProviderCertificate ( ).

At (12), the data storage appliance 110 stores the signed server certificate 230 (SSC) in the certificate store 124. The signed server certificate 230 is stored in association with the identifier 250, which corresponds to the indicator 162 and is specific to the VMMC 130a.

At this point, the data storage appliance 110 has a properly signed server certificate 230, which it can use in TLS communications. Such TLS communications can take place automatically, without the need to involve the administrator 102. Thus, each party has all of the certificates needed for efficient and automatic TLS communications.

At (13), trusted TLS communications may proceed between the VMMC 130a and the data storage appliance 110 based on the certificates established. Such communications involve the use of indicator 162, which enables the data storage appliance 110 to locate the certificates associated with VMMC 130a.

For example, the VMMC 130a may initiate a second TLS session with the data storage appliance 110 by sending a second request 160 (not shown). The second request includes the indicator 162, which was used previously in generating the signed server certificate 230. Upon receiving the second request, the data storage appliance 110 obtains the indicator 162 and checks its certificate store 124 for any certificates associated with the indicator 162, thus finding a match between the indicator 162 and the identifier 250. The match identifies certificates 136, 137, and 230, and the data storage appliance 110 proceeds to use those certificates in the ensuing TLS session. As the certificates 136, 137, and 230 are properly signed (rather than self-signed), The TLS session can proceed without administrator involvement.

If the indicator 162 were not provided in the second request, the data storage appliance 110 might fail to locate the certificates of the VMMC 130a. In such a case the data storage appliance 110 may respond by providing the self-signed certificate 210. The procedure described above may then be repeated. A similar result may follow if a request includes an indicator 162 but the indicator is not recognized by the data storage appliance 110.

Figure 3:
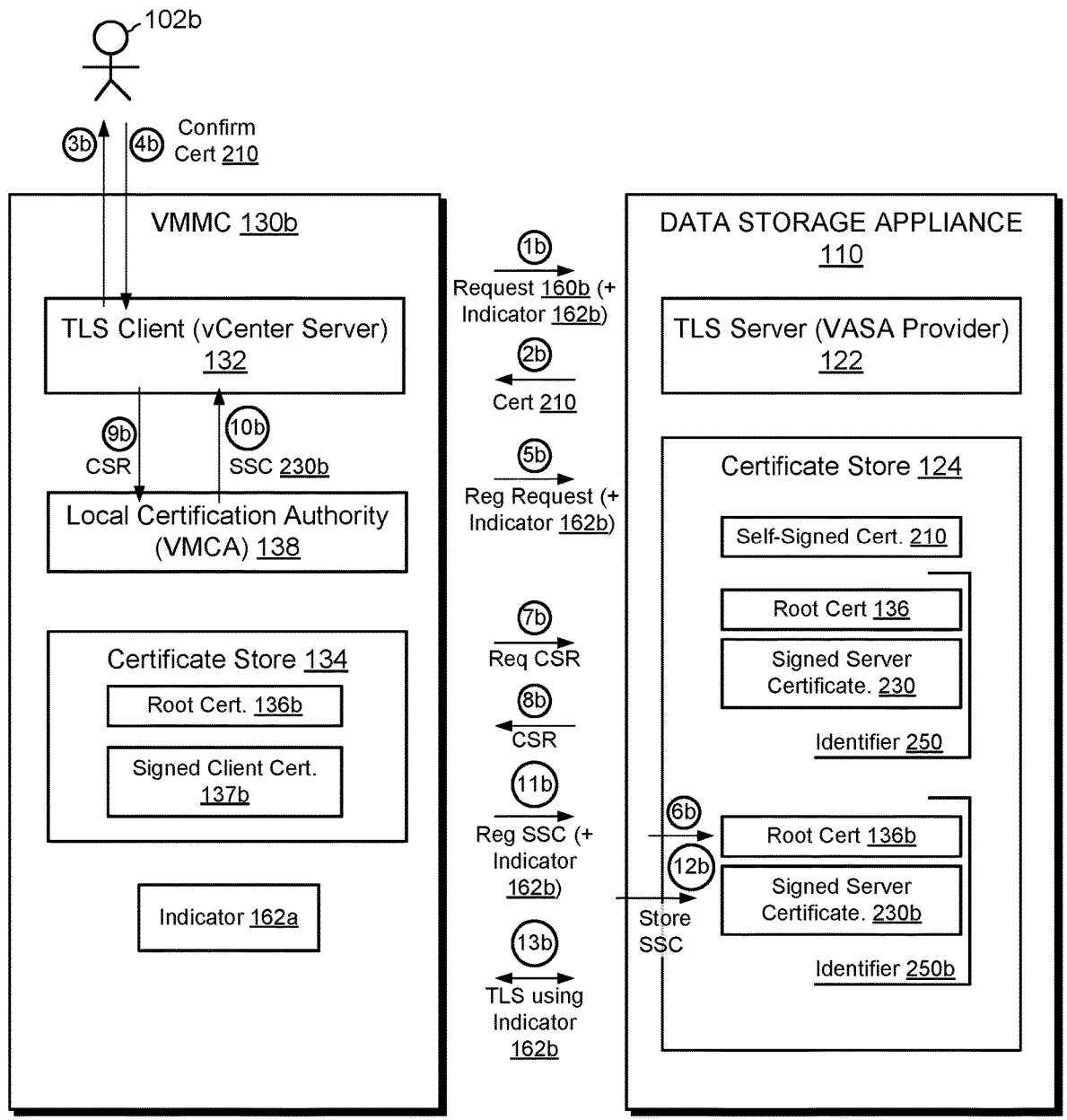
FIG. 3 is a block diagram of an example arrangement for establishing a trusted communication session between the server and a second client.

FIG. 3 shows an example of this scenario, i.e., one in which a request includes an indicator which is not recognized by the data storage appliance 110. The example of FIG. 3 involves the second VMMC 130b, which acts as a second TLS client. Here, VMMC 130b has its own indicator 162b, which is different from the indicator 162 used by VMMC 130a. VMMC 130b also has its own root certificate 136b and its own signed client certificate 137b, which are different from those of VMMC 130a. Once again, the encircled numerals depict an example sequence of activities (represented in the text as numerals within parentheses).

At (1b), VMMC 130b sends a request 160b to data storage appliance 110 to initiate a TLS session. The request 160b includes or otherwise is associated with indicator 162b, which is preferably unique to VMMC 130b.

The data storage appliance 110 receives the request 160b and checks whether the indicator 162b corresponds to any certificates in its certificate store 124. In this case, certificates 136, 137, and 230 have already been stored and associated with identifier 250. Indicator 162b does not match identifier 250, however. Thus, data storage appliance 110a determines that it does not have certificates of VMMC 130b and that VMMC 130b is untrusted.

At (2b), the data storage appliance 110 responds to request 160b by providing the self-signed certificate 210, just as it did for VMMC 130a.

At (3b), VMMC 130b presents the self-signed certificate 210 to an administrator 102b, e.g., by displaying the self-signed certificate 210 on a computer monitor viewable by administrator 102b. The administrator inspects the certificate and at (4b) confirms its authenticity.

At (5b), the VMMC 130b initiates a registration procedure in an effort to produce a more trusted signed server certificate of the data storage appliance 110. For example, VMMC 130b sends a registration request to the data storage appliance 110, which may include as parameters a user name, a password, and the root certificate 136b. It may also include the above-described indicator 162b, which serves to identify the VMMC 130b. As before, the registration request may be implemented as an API call having the form registerCACertificatesAndCRLs ( ).

At (6b), the data storage appliance 110 receives the registration request and attempts to validate the credentials (e.g., user name and password). Assuming success, the data storage appliance 110 creates a new identifier 250b and stores the root certificate 136b in the certificate store 124 in connection with the new identifier 250b.

At (7b), the VMMC 130b sends a request to the data storage appliance 110 for a certificate signing request (CSR). The request may be implemented as an API call having the form requestCSR ( ) At (8b), the data storage appliance 110 responds by providing the requested CSR.

At (9b), the VMMC 130b receives the CSR and passes it to the local certification authority 138. At (10b), the local certification authority 138 responds by generating a signed server certificate (SSC) 230b. The signed server certificate 230b is created using the root certificate 136b and thus differs from the signed server certificate 230 which was created using root certificate 136.

At (11b), the VMMC 130b sends a registration command to the data storage appliance 110. The registration command includes both the signed server certificate 230b and the indicator 162b. The registration command may be implemented as an API call having the form registerCASignedProviderCertificate ( ).

At (12b), the data storage appliance 110 stores the signed server certificate 230b in the certificate store 124. The signed server certificate 230b is stored in association with the identifier 250b, which corresponds to the indicator 162b and is specific to the VMMC 130b.

The data storage appliance 110 thus has the properly signed server certificate 230b, which it can now use in TLS communications. Such TLS communications can take place automatically, without the need to involve the administrator. VMMC 130b and data storage appliance 110 may each store the signed certificate of the other in its respective certificate store.

At (13b), trusted TLS communications may proceed between the VMMC 130b and the data storage appliance 110 based on the certificates established. For example, any request 160b arriving from VMMC 130b and including indicator 162b will trigger the data storage appliance 110 to apply certificates associated with indicator 162b, i.e., certificates 136b, 137b, and 230b as located via identifier 250b, which matches indicator 162b.

Data storage appliance 110 can also continue to conduct TLS communications with VMMC 130a. For example, any request 160 arriving from VMMC 130a and including the indicator 162 will trigger the data storage appliance 110 to apply certificates associated with indicator 162, i.e., certificates 136, 137, and 230, as located via identifier 250, which matches indicator 162. Thus, establishing certificates for VMMC 130b does not replace the certificates previously established for VMMC 130a, and data storage appliance 110 can conduct trusted TLS communications with both VMMCs without requiring administrative involvement or other disruptive activities.

One should appreciate that the procedures described above in connection with FIGS. 2 and 3 may be repeated for any number of additional VMMCs 130. Requests for TLS sessions from already-registered VMMCs 130 prompt the data storage appliance 110 to supply the corresponding certificates (assuming indicators are provided). Requests for TLS sessions with unregistered VMMCs 130 prompt the data storage appliance 1110 to supply the self-signed certificate 210, which may serve as an invitation to register such VMMCs. The disruptive replacement of one VMMC's certificates for another's has thus been completely addressed and remediated.

As stated in connection with FIG. 1, each VMMC 130 may be associated with any number of hosts 150. For example, a VMMC may share its signed client certificate (e.g., 137), signed server certificate (e.g., 230), and indicator (e.g., 162) with any hosts 150 in its management domain. Thus, VMMC 130a may share these elements with hosts 150a, VMMC 130b may share corresponding elements with hosts 150b, and so on. The respective hosts 150 can then conduct trusted TLS communications directly with the data storage appliance 110. For example, any host 150 can use the respective certificates and indicator to securely access its VVols 128 from the data storage appliance 110.

The indicator 162 may be realized in a variety of ways. One particularly effective way is to leverage an extension to the TLS protocol called Server Name Indication, or SNI. As is known, SNI supports the sharing of IP addresses among different websites or other server resources. Rather than allocating (and paying for) multiple static IP addresses for hosting multiple server resources, SNI allows the server resources to be hosted from a single IP address, with the SNI used to distinguish among them. SNI therefore saves customer money and can simplify server maintenance.

We have recognized that the same SNI technology used for hosting multiple server resources can also be applied to the separate matter of preventing one TLS client from overwriting the certificates of another. Thus, the data storage appliance 110 may use SNI as a vehicle for distinguishing different clients, e.g., clients using respective root certificates.

As indicated above, VMMCs 130 can generate indicators 162 as SNIs based on UUID, host name, or in any other manner that preferably uniquely identifies the VMMCs. Sharing information between a VMMC and its managed hosts 150 may thus include sharing the SNI, as the hosts 150 can use the same SNI as their managing VMMCs to access the data storage appliance 110.

Although SNIs provide a powerful mechanism for preventing VMMCs 130 from disrupting one another's certificates, they are not the only option. Other examples include assigning different IP addresses for use by respective VMMCs 130. For example, multiple IP addresses may be allocated to the data storage appliance 110, and the data storage appliance 110 may assign IP addresses as indicators 162 to respective VMMCs 130. TLS inherently supports the maintenance of different certificates for different IP addresses. In this manner, the IP address to which a request 160 is directed can itself serve as the desired indicator 162.

For example, a VMMC sending a request 160 to participate in a TLS session may direct the request 160 to the IP address it was assigned. The data storage appliance 110 may receive the request 160 via the assigned IP address and apply the corresponding certificates. As the data storage appliance 110 directs requests 160 to respective sets of certificates based on IP address, the VMMCs do not interfere with one another and disruption is avoided. In this scenario, the data storage appliance 110 may use IP addresses as the identifiers 250, i.e., the identifiers used to match indicators 162 to certificates.

Another example includes assigning different TCP (Transport Control Protocol) port numbers for use by respective VMMCs 130. For example, the data storage appliance 110 may use multiple TCP ports for communication over the Internet and may assign TCP port numbers as indicators 162 to respective VMMCs 130. As with IP addresses, TLS inherently supports the maintenance of different certificates for respective TCP ports. In this manner, the TCP port number to which a request 160 is directed can itself serve as the desired indicator 162.

For example, a VMMC sending a request 160 to participate in a TLS session may direct the request 160 to the port number that it was assigned. The data storage appliance 110 may receive the request 160 via the assigned TCP port number and apply the corresponding certificates. As the data storage appliance 110 directs requests 160 to respective sets of certificates based on TCP port number, the VMMCs do not interfere with one another and disruption is avoided. In this scenario, the data storage appliance 110 may use TCP port numbers as identifiers 250, i.e., as the identifiers used to match indicators 162 to certificates.

Figure 4:
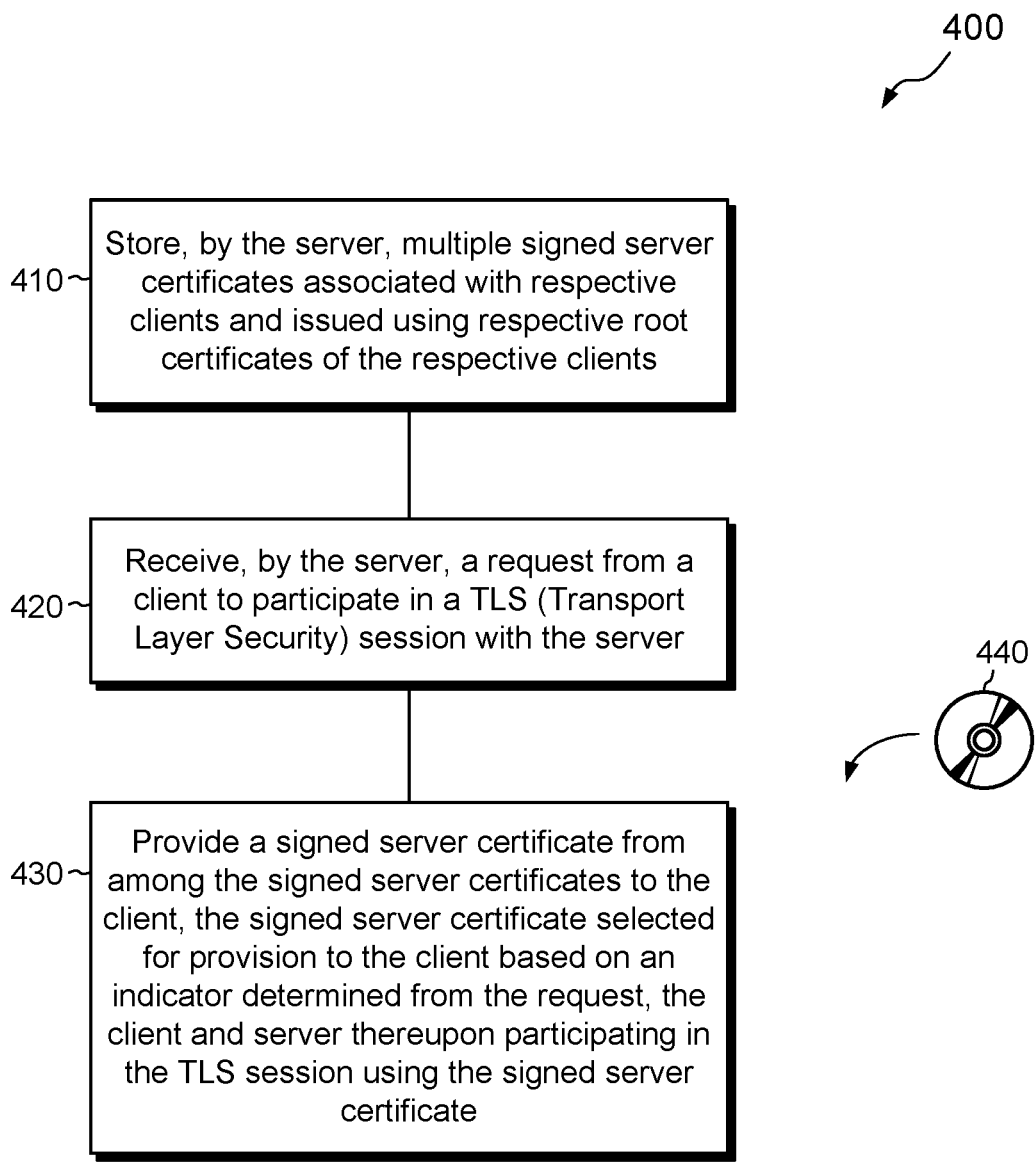
FIG. 4 is a flowchart that shows and example method of managing communications between a server and multiple clients.

FIG. 4 shows an example method 400 that may be carried out in connection with the environment 100 and provides a review of some of the features described above. The method 400 is typically performed, for example, by the software constructs described in connection with FIG. 1, which reside in the memory 120 of the data storage appliance 110 and are run by the set of processors 124. The various acts of method 400 may be ordered in any suitable way. Accordingly, embodiments may be constructed in which acts are performed in orders different from that illustrated, which may include performing some acts simultaneously. One may recognize that suffixes of reference signs (e.g., "b") have been omitted in the description below for the sake of clarity. For example, reference "160" as used below may describe any request to participate in a TLS session, whether it corresponds to the request 160 of FIG. 2, to the request 160b of FIG. 3, or to some other request.

At 410, the server, e.g., the data storage appliance 110, stores multiple signed server certificates 230 associated with respective clients, e.g., VMMCs 130. The signed server certificates 230 are issued using respective root certificates 136 of the respective clients.

At 420, the server 110 receives a request 160 from a client 130 to participate in a TLS (Transport Layer Security) session with the server 110.

At 430, a signed server certificate 230 is provided from among the signed server certificates to the client 130. The signed server certificate 230 is selected for provision to the client 130 based on an indicator 162 determined from the request 160. The client 130 and server 110 thereupon participate in the TLS session using the signed server certificate 230.

An improved technique has been described for managing communications between a server 110 and multiple clients 130. The technique includes configuring the server 110 to support multiple sets of certificates for respective clients 130 having respective root certificates 136. The technique includes determining an indicator 162 associated with a client root certificate 136 during an initial handshake between a client 130 and the server 110 and providing the client 130 with a server certificate 230 associated with the indicator 162. Advantageously, the server 110 matches clients 130 with server certificates 230 created for those clients, enabling multiple clients 130 to carry out trusted communications with the server 110 automatically without disrupting communications of other clients.

Having described certain embodiments, numerous alternative embodiments or variations can be made. For example, although the disclosed embodiments involve a data storage appliance 110, VMMCs 130, and hosts 150, embodiments are not so limited. For example, other embodiments may be constructed that include any arrangement of a TLS server and multiple TLS clients having respective root certificates.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 440 in FIG. 4). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of managing communications between a server and multiple clients, the method comprising:
storing, by the server, multiple signed server certificates associated with respective clients and issued using respective root certificates of the respective clients, the root certificates being client-specific and differing from one another;
receiving, by the server, a request from a client to participate in a TLS (Transport Layer Security) session with the server; and
providing a signed server certificate from among the signed server certificates to the client, the signed server certificate selected for provision to the client based on an indicator determined from the request, the client and server thereupon participating in the TLS session using the signed server certificate,
wherein the indicator determined from the request includes a Server Name Indication (SNI) provided in the request, wherein the server associates the multiple signed server certificates with respective SNIs, and wherein, when receiving the request, the SNI includes a name associated with the client.

2. The method of claim 1, further comprising the server associating the signed server certificates with respective identifiers, wherein the signed server certificate is selected for provision to the client based on matching the indicator with one of the identifiers.

3. The method of claim 2, wherein the client includes a management console for managing virtual machines, wherein the server includes a data storage appliance, and wherein the method further comprises the server hosting multiple virtual machine disks accessible to a plurality of clients over TLS via respective signed server certificates.

4. The method of claim 3, wherein the management console manages multiple virtual machine host computers, and wherein the method further comprises the server participating in another TLS session with one of the virtual machine host computers using the signed server certificate provided to the client.

5. The method of claim 2, further comprising the server storing, in connection with at least one signed server certificate, (i) a respective root certificate and (ii) a respective signed client certificate.

6. The method of claim 1, further comprising:
receiving a second request from a second client to participate in a second TLS session with the server, the second request including a second SNI;
determining, by the server, that none of the signed server certificates stored by the server is associated with the second SNI; and
storing, by the server, a second signed server certificate based on a second root certificate of the second client, the server associating the second signed server certificate with the second SNI.

7. The method of claim 6, further comprising the second client and the server participating in the second TLS session using the second signed server certificate.

8. The method of claim 1 wherein, when receiving the request, the SNI further includes a UUID (universally unique identifier) generated by the client.

9. The method of claim 1, wherein the indicator determined from the request further includes an IP (Internet Protocol) address to which the request is directed, the server associating the signed server certificates with respective IP addresses.

10. The method of claim 1, wherein the indicator determined from the request further includes a TCP (Transport Control Protocol) port number to which the request is directed, the server associating the signed server certificates with respective TCP port numbers.

11. A computerized apparatus, comprising control circuitry that includes a set of processing units coupled to memory, the control circuitry constructed and arranged to:
store, by a server, multiple signed server certificates associated with respective clients and issued using respective root certificates of the respective clients, the root certificates being client-specific and differing from one another;
receive, by the server, a request from a client to participate in a TLS (Transport Layer Security) session with the server; and
provide a signed server certificate from among the signed server certificates to the client, the signed server certificate selected for provision to the client based on an indicator determined from the request, the client and server thereupon participating in the TLS session using the signed server certificate, wherein the indicator determined from the request includes a Server Name Indication (SNI) provided in the request, wherein the server associates the multiple signed server certificates with respective SNIs, and wherein, when receiving the request, the SNI includes a name associated with the client.

12. A computer program product including a set of non-transitory, computer-readable media having instructions which, when executed by control circuitry of a computerized apparatus, cause the computerized apparatus to perform a method of managing communications between a server and multiple clients, the method comprising:

storing, by the server, multiple signed server certificates associated with respective clients and issued using respective root certificates of the respective clients, the root certificates being client-specific and differing from one another;

receiving, by the server, a request from a client to participate in a TLS (Transport Layer Security) session with the server; and providing a signed server certificate from among the signed server certificates to the client, the signed server certificate selected for provision to the client based on an indicator determined from the request, the client and server thereupon participating in the TLS session using the signed server certificate, wherein the indicator determined from the request includes a Server Name Indication (SNI) provided in the request, wherein the server associates the multiple signed server certificates with respective SNIs, and wherein, when receiving the request, the SNI includes a name associated with the client.

13. The computer program product of claim 12, wherein the method further comprises the server associating the signed server certificates with respective identifiers, wherein the signed server certificate is selected for provision to the client based on matching the indicator with one of the identifiers.

14. The computer program product of claim 12, wherein the method further comprises:

receiving a second request from a second client to participate in a second TLS session with the server, the second request including a second SNI;

determining, by the server, that none of the signed server certificates stored by the server is associated with the second SNI; and storing, by the server, a second signed server certificate based on a second root certificate of the second client, the server associating the second signed server certificate with the second SNI.

15. The computer program product of claim 14, further comprising the second client and the server participating in the second TLS session using the second signed server certificate.

16. The computer program product of claim 12, wherein the indicator determined from the request further includes an IP (Internet Protocol) address to which the request is directed, the server associating the signed server certificates with respective IP addresses.

17. The computer program product of claim 12, wherein the indicator determined from the request further includes a TCP (Transport Control Protocol) port number to which the request is directed, the server associating the signed server certificates with respective TCP port numbers.

* * * * *